United States Patent
Akahane et al.

(10) Patent No.: US 6,991,283 B2
(45) Date of Patent: Jan. 31, 2006

(54) SHUTTER TYPE GUARD APPARATUS FOR CONSTRUCTION MACHINE

(75) Inventors: Eiji Akahane, Tokyo (JP); Yusuke Harayama, Kawasaki (JP); Mikiya Yagi, Takarazuka (JP); Seiji Hiraoka, Kobe (JP)

(73) Assignees: Shin Caterpillar Mitsubishi Ltd., Tokyo (JP); Press Kogyo Co., Ltd., Kawasaki (JP); Nippon Cable Systems, Inc., Takarazuka (JP); Tomoe System Inc., Kobe (JP)

( * ) Notice: Subject to any disclaimer, the term of this patent is extended or adjusted under 35 U.S.C. 154(b) by 61 days.

(21) Appl. No.: 10/490,142

(22) PCT Filed: Jun. 2, 2003

(86) PCT No.: PCT/JP03/06972

§ 371 (c)(1),
(2), (4) Date: Mar. 19, 2004

(65) Prior Publication Data

US 2004/0245755 A1 Dec. 9, 2004

(30) Foreign Application Priority Data

Aug. 20, 2002 (JP) ............................. 2002-239567

(51) Int. Cl.
*B60J 7/00* (2006.01)

(52) U.S. Cl. ................ 296/190.08; 296/155; 296/97.7
(58) Field of Classification Search .......... 296/190.08, 296/155, 95.1, 98, 97.7, 97.4, 146.13, 24.1, 296/190.03, 190.1, 190.11, 152, 146.8; 280/847, 280/851, 32.5; 160/120, 201, 188; 49/74.1
See application file for complete search history.

(56) References Cited

U.S. PATENT DOCUMENTS

| | | | | |
|---|---|---|---|---|
| 3,078,917 A | * | 2/1963 | Recchione | 160/120 |
| 3,385,459 A | * | 5/1968 | Wellman, Jr. | 280/32.5 |
| 4,775,180 A | * | 10/1988 | Phillips | 296/97.7 |
| 4,889,381 A | * | 12/1989 | Tamblyn et al. | 296/98 |
| 5,044,686 A | * | 9/1991 | Acenbrack | 296/97.7 |
| RE33,804 E | * | 1/1992 | Phillips | 296/97.7 |
| 5,154,468 A | * | 10/1992 | Teigen et al. | 296/155 |
| 5,330,246 A | * | 7/1994 | Bernardo | 296/98 |
| 5,547,241 A | * | 8/1996 | Villella et al. | 296/155 |

(Continued)

FOREIGN PATENT DOCUMENTS

JP         A 6-340215         12/1994

(Continued)

*Primary Examiner*—Kiran B. Patel
(74) *Attorney, Agent, or Firm*—Oliff & Berridge, PLC

(57) ABSTRACT

A shutter type guard apparatus composed of a movable guard member which can be opened and closed for covering the window portion of the cab of a piece of machinery. The guard member is structured so that it can be closed to an intermediately opened position where it is easily operated. An auxiliary closing device includes a cable winding device for winding the first cable, a travelling unit coupled between the first cable and a second cable, an auxiliary guide rail in which the travelling unit and the first and second cables are guided for movement, and a pull handle coupled to the second cable. The auxiliary guide member is at one of a pair of left and right guide rails, for guiding the movable guard member. The pull handle is disposed at an intermediate position, in the vertical direction of the guide rail, and by pulling the pull handle downward, the guard member is forcibly closed to an intermediately opened/closed position where it can be easily reached and further closed by hand by an operator.

20 Claims, 10 Drawing Sheets

U.S. PATENT DOCUMENTS

| | | | |
|---|---|---|---|
| 5,746,469 A * | 5/1998 | Nonaka | 296/97.7 |
| 6,022,067 A * | 2/2000 | Hargett et al. | 296/155 |
| 6,227,601 B1 * | 5/2001 | LaFrance | 296/97.4 |
| 6,257,651 B1 * | 7/2001 | Morbach et al. | 296/146.13 |
| 6,427,749 B1 * | 8/2002 | Swink et al. | 160/188 |
| 6,513,862 B2 * | 2/2003 | Dodson et al. | 296/15 |
| 6,672,362 B1 * | 1/2004 | Mullet et al. | 160/201 |
| 2002/0140243 A1 * | 10/2002 | Alemagna | 296/24.1 |
| 2004/0003540 A1 * | 1/2004 | Horn et al. | 49/74.1 |

FOREIGN PATENT DOCUMENTS

| | | |
|---|---|---|
| JP | A 7-25243 | 1/1995 |
| JP | U 7-4119 | 1/1995 |
| JP | A 2002-212975 | 7/2002 |

* cited by examiner

Fig. 5(A)
Fig. 5(B)
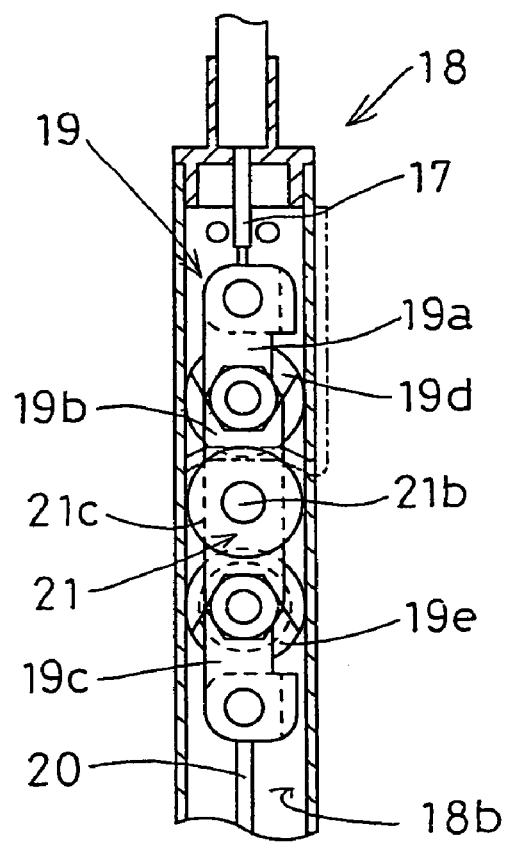
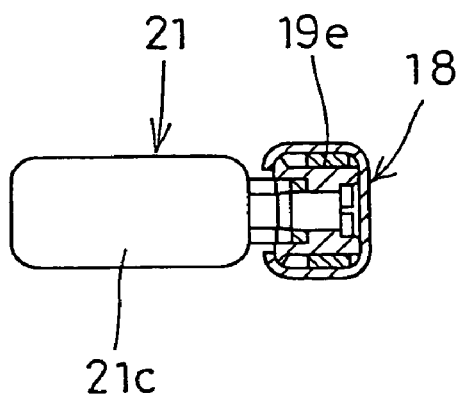

SHUTTER TYPE GUARD APPARATUS FOR CONSTRUCTION MACHINE

FIELD OF THE INVENTION

The present invention relates to a shutter type guard apparatus for a construction machine, which protects the window portion of a construction machine such as a hydraulic shovel.

BACKGROUND OF THE INVENTION

Generally, some construction machines are equipped with guarding plates which are detachably mounted on the window portions for the purpose of preventing vandalism and/or theft during being parked. Since such guarding plates are not required during working, the guarding plates are removed from the window parts and are accommodated in accommodation chambers attached to the construction machines. However, it is cumbersome to attach the guarding plates to the window parts and detach the same therefrom and hard work is required therefor. Further, there is another problem in that spaces for the accommodation chambers must be secured in the construction machines.

Therefore, in order to cope with such situations, JP 2002-212975-A proposes a shutter type guard apparatus that consists of a pair of left and right guide rails disposed at the left and right sides of the window portion and a movable guard member (shutter curtain) that, while being guided by the corresponding guide rails, is moved to its open position to open the window portion and to its closed position to enclose the window portion. Further, the above-described application also proposed a type in which a skylight is provided at the ceiling portion of an operator's cabin, a pair of left and right guide rails are formed so as to be curved from the side of the front window portion to the side of the ceiling skylight portion, and the guard member closes both the front window portion and ceiling skylight portion.

Moreover, in the case of a manual operation type in which the above-described shutter type guard apparatus is opened and closed by manual operation, a closing operation of the guard member is carried out by, for example, holding or grasping the lower end portion of the guard member by hand. At this time, where the guard member is structured so that it closes both the front window portion and the ceiling skylight portion, the lower end portion of the guard member is located at the ceiling portion when the guard member is at its opened position, and an operator cannot reach to the lower end portion of the guard member by hand. Accordingly, it can be assumed that an operating rod or so is prepared, the tip end thereof is hooked to the lower end portion of the guard member, and the operating rod is operated and pulled, whereby the guard member can be closed. However, in this case, another problem arises in that, since the lower end portion of the guard member is at the ceiling portion, not only it is difficult to hook the operating rod to the guard member, but also it becomes difficult to carry out a closing operation because the operating rod is operated and pulled downward after it is first operated and pulled forward. On the other hand, it can be assumed that an operating cord is provided at the lower portion of the guard member and the guard member is closed by operating and pulling the operating cord. However, in this case, still another problem arises in that, since the operating cord is exposed from the ceiling skylight portion upwards of the front window portion, not only does the cord become an obstacle, but the operating cord also remains hung from the lower end portion when the guard member is closed. Moreover, in either case, because the operating rod or cord is operated so as to slide on the ceiling skylight portion when operating and pulling forward the operating rod or cord, if the ceiling skylight portion is formed of a transparent material such as acrylate resin, etc., there is a fear that the window portion will be damaged. The present invention solves the above-described problems and other shortcomings.

DISCLOSURE OF THE INVENTION

In view of the above-described situations, the present invention was developed to solve these problems. The present invention is featured in that a guard apparatus for protecting the window portion of construction machinery is composed of a pair of left and right guide rails disposed at the left and right sides of the window portion and a movable guard member that, while its left and right edge portions are being guided by the corresponding guide rails, the guard member is moved to its open position to open the window portion and to its closed position to close the window portion, wherein an auxiliary closing device comprises an engagement body moving so that, while an engagement receiving member is provided at the lower end portion of the guard member, the engagement body is engaged with the engagement receiving member in the above-described guide rails and forcibly closes the guard member from its open position to an intermediate open position where an operator is able to operate the guard member; and an operating tool for enabling a movement operation of the corresponding engagement body, and the operating tool is disposed at an intermediate portion in the vertical direction where the operator is able to operate.

And, with such a construction, where the guard member being at its open position is closed, the guard member can be closed to an intermediate open position by using the operating tool which is located at the position where an operator is able to operate, and a closing operation of the guard member can be easily carried out.

In such a construction, the auxiliary closing device according to the invention comprises: an engagement body; a travelling unit secured at the base end portion of the corresponding engagement body; an auxiliary guide rail, integrally secured at an upper portion of the guide rails, in which the above-described travelling unit movably travels; a first cable at the open side and a second cable at the closed side, both of which respectively extend from the above-described travelling unit to both sides in the travelling direction and moves in the auxiliary guide rails; a winding device, installed at the open position side of the guard member, which winds up the extended end side of the first cable; a resilient pressing device secured at the corresponding winding device, which presses the first cable in the winding direction; and an operating tool coupled to the extended end portion of the second cable; wherein the engagement body is constructed so that it is displaced between its non-actuated state located at the opened position of the guard member and its actuating state for closing the guard member from its opened position to an intermediate opened position in linkage with a pulling operation against a pressing force of the resilient pressing device of the operating tool, and is reset to the non-actuated state by stopping a pulling operation. Thereby, it is possible to close the guard member to an intermediate opened position with a simple operation of pulling the operating tool, and further by stopping the pulling operation, the operating tool can be returned to its original position along with the engagement body, wherein the engagement body and operating tool do not become an obstacle.

In addition, in such a construction, the travelling unit according to the invention may include a main plate at which the base end portion of the engagement body is fixed, a first plate and a second plate, coupled to both ends in the travelling direction of the corresponding main plate, to which the above-described first and second cables are coupled, a pair of travelling rollers axially supported at both ends in the travelling direction of the engagement body fixing portion of the above-described main plate, wherein movement of the travelling unit can be smoothly carried out where a large load is given to the engagement body.

Also, in such a construction, a guard apparatus according to the invention is constructed so that the guard member encloses the front window portion and the ceiling skylight portion, wherein the guide rails and auxiliary guide rails are provided with a curved portion at the upper portions thereof.

Further, in such a construction, according to the invention, coupling between the main plate and the first and second plates and between the first and second plates and the first and second cables is rockably carried out, wherein since the respective coupled portions of the travelling unit are able to rock, the travelling unit is able to travel in the curved portion of the auxiliary guide rails formed along the guide rails. Therefore, where the travelling unit travels in the auxiliary guide rails, smooth travelling is enabled.

Still further, in such a construction, the auxiliary closing device may be provided at one side in the left and right directions of the guard member, wherein the number of components may be reduced.

BRIEF DESCRIPTION OF THE DRAWINGS

FIGS. 5(A) and (B) are, respectively, a side sectional view showing the upper portion of the auxiliary guide rail, and a sectional view taken along the line X—X in FIG. 4;

BEST MODE FOR CARRYING OUT THE INVENTION

Figure 1:
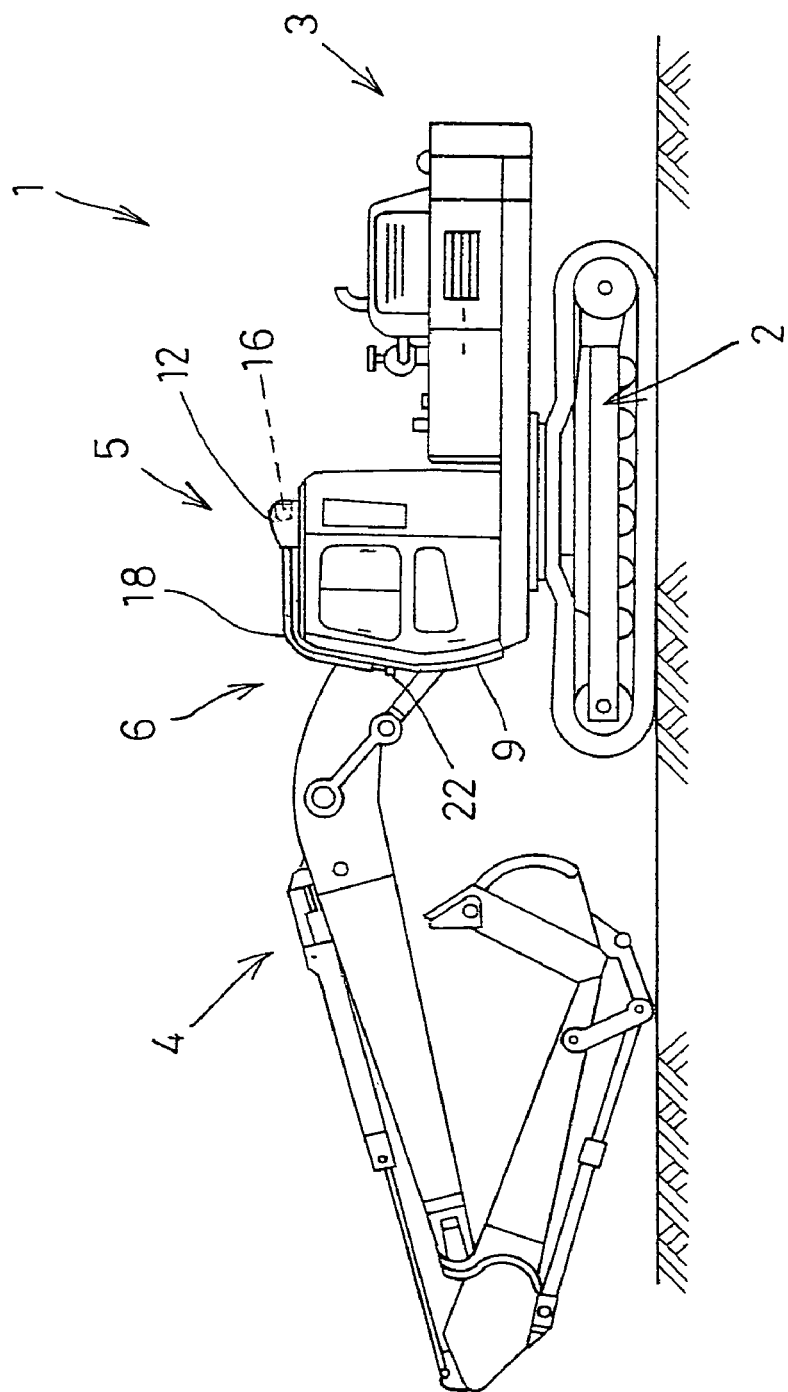
FIG. 1 is a side elevational view of a hydraulic shovel.

Next, a description is given of a first embodiment of the invention with reference to FIG. 1 through FIG. 10. In the drawings, reference number 1 denotes a hydraulic shovel of a construction machine. The hydraulic shovel 1 is composed of respective components such as a crawler type lower structure 2, an upper structure 3 which is rotatably supported on the lower structure 2, and a front attachment 4 which is mounted on the upper structure 3. In addition, a cab 5 corresponding to an operator's cabin according to the invention is disposed in the upper structure 3.

Reference number 6 denotes a shutter type guard apparatus for protecting the entire range from the front window portion 7 provided at the front side of the above-described cab 5 to the ceiling skylight portion 8 secured on the ceiling portion. The shutter type guard apparatus 6 is composed of members and devices such as a pair of left and right guide rails 9 disposed at both left and right sides of the front window portion 7 and ceiling skylight portion 8, a guard member 10 which is guided by the left and right guide rails 9 and moves to its closed position and open position, (described later), a winding device 11 for winding the guard member 10, and a shutter casing 12 fixed at the rear portion of the ceiling skylight portion 8 of the cab 5, in which the winding device 11 is provided.

In addition, the window portion other than the front window portion 7 and ceiling skylight portion 8, which are provided at the cab 5, is formed of a reinforced resin such as polycarbonate resin, etc., wherein it is attempted that the cab is protected or defended from vandalism and theft.

The above-described left and right guide rails 9 are formed to be curved from the lower end portion of the front window portion 7 to the front end portion of the shutter casing 12, wherein a vertical guide rail portion 9a erected in the vertical direction, a curved guide rail portion (curved portion) 9b folded to be curved, and a horizontal guide rail portion 9c placed in the forward and backward direction are integrally formed. And, the vertical guide rail portion 9a is set and fixed to the left and right front pillars 13 that become the front side columns of the cab 5. The curved guide rail portion 9b and horizontal guide rail portion 9c are set and fixed to a portion extending from the upper end portion of the front pillar 13 to the ceiling face 14 side. Further, the guide rails 9 have guide grooves 9d whose sections are U-shaped and which are open at the inside thereof in the left and right directions, wherein both the left and right edge portions of the guard member 10 are slidably fitted in the guide grooves 9d.

On the other hand, the guard member 10 is formed by consecutively providing a plurality of slats 10a in the vertical direction, and the upper end portion of the guard member 10 is fixed to a winding drum 11a that composes the winding device 11. Further, on a seat plate 10b coupled to the lower end portion of the guard member 10, an engagement receiving member 15 is integrally provided, which is positioned at one side in the left and right directions (the right side when facing the drawing in FIG. 2 in the case of the present embodiment) and protrudes forward in a state where the guard member 10 is positioned in its closed position. Also, the engagement receiving member 15 is composed of a projecting piece 15a projecting forward from the front side of the seat plate 10b and a folded piece 15b folded upward from the projecting edge portion of the projecting piece 15a, and a clearance portion is formed between the folded piece 15b and the front side of the seat plate 10b.

The above-described winding drum 11a is rockably supported around a supporting axis (not illustrated) supported between the left and right side faces of the shutter casing 12, and a winding spring (resilient balance device not illustrated) intervenes between the supporting axis and the winding drum 11a. And, the guard member 10 is unwound from and wound around the winding drum 11a, whereby, in a state where both the left and right edge portions of the guard member are guided by the guide grooves 9d of the above-described left and right guide rails 9, the guard member 10 is moved to open at its open position at which the forward portion of the front window portion 7 and the upward portion of the ceiling skylight portion 8 are opened, and to close at its closed position which encloses the forward portion of the front window portion 7 and the upward portion of the ceiling skylight portion 8. In addition, the winding device 11 is a manual drive type. A winding spring is provided between the winding drum 11*a* and the fixing axis and is set so as to have a pressing force which is roughly balanced by the self weight of the unwound guard member 10, wherein the above-described winding spring presses the guard member 10 in the winding direction in an opening operation of the guard member 10, and the guard member 10 can be opened with only a slight operating force.

Reference number 16 denotes a cable winding device (which corresponds to the winding device of the invention) which composes an auxiliary closing device CS according to the invention. The cable winding device 16 is accommodated in the shutter casing 12 together with the winding device 11, and is fixed on the inner face at one side (the right side in the case of the present invention) in the left and right directions of the shutter casing 12. The above-described cable winding device 16 is composed so that a rockably supported rotating body 16*b* is provided in the casing 16*a*, one end portion of the first cable 17 is coupled to the rotating body 16*b*, and the first cable 17 is wound and unwound in line with rotation of the rotating body 16*b*. The first cable 17 is composed so as to be drawn outward from the casing 16*a* through a drawer port 16*c* integrally formed on the casing 16*a*, and at the same time, is established so as to be always pressed in the direction of winding on the rotating body 16*b* by a winding spring (not illustrated) which intervenes between the casing 16*a* and the rotating body 16*b*.

Reference number 18 denotes an auxiliary guide rail 18, which is provided at the above-described one guide rail 9 (the right side guide rail). The auxiliary guide rail 18 has a curved portion 18*a* formed at an intermediate portion thereof to go along the guide rail 9, and is integrally fixed along a section from an intermediate portion in the vertical direction of the vertical guide rail portion 9*a*, which can be reached by the hand of an operator when the operator rides on the lower structure, to the curved guide rail portion 9*b* and horizontal guide rail portion 9*c*. Further, the auxiliary guide rail 18 has a fitting groove 18*b*, whose depth is shallower than that of the guide rail guide groove 9*d* and whose section is roughly U-shaped, formed in a state where it is oriented inwardly in the left and right directions. The upper side end portion of the fitting groove 18*b* is faced to the drawer port 16*c* of the above-described cable winding device 16, and the winding tip end portion of the first cable 17 which is drawn out from the drawer port 16*c* is established so that it is pulled out to the auxiliary guide rail fitting groove 18*b* side via a through hole (not illustrated) opened in the shutter casing 12.

In this connection, the auxiliary guide rail 18 is provided so that the upward side end portion which is the tip end at the side going along the horizontal guide rail portion 9*c* butts the front end portion of the shutter casing 12. Also, the auxiliary guide rail 18 is provided to be biased inwardly in the left and right directions of the guide rail 9 so that the groove-opened position of the fitting groove 18*b* is located roughly at the same position as the groove-opened position of the guide rail groove 9*d*.

Further, a travelling unit 19 is coupled to the winding tip end portion of the above-described first cable 17. The travelling unit 19 is movably fitted in the fitting groove 18*b* of the above-described auxiliary guide rail 18. And, as described later, the first cable 17 is unwound from the cable winding device 16 or is wound around the cable winding device 16. In line therewith, the travelling unit 19 is set so that it travels in the auxiliary guide rail 18. At this time, a stopper member 18*d* formed of a resin material is formed so as to bring about an impact-dampening feature at the opposite side end portion (the lower end portion) of the above-described shutter casing 12 side of the auxiliary guide rail 18 while a stopper piece 18*c* is formed at the side end portion (the upward side end portion) of the shutter casing 12 of the auxiliary guide rail 18. The travelling unit 19 is set so as to movably travel in the fitting groove 18*b* of the auxiliary guide rail 18 in a moving range between the stopper piece 18*c* and the stopper member 18*d*.

The travelling unit 19 is composed of a first plate 19*a* rockably coupled to the winding end portion of the first cable 17, a main plate 19*b*, one end in the rail lengthwise direction of which is rockably coupled to the first plate 19*a*, and a second plate 19*c*, which is rockably coupled to the other end in the rail lengthwise direction of the corresponding main plate 19*b*, and to which the base end portion of the second cable 20 described later is rockably coupled. And, a pair of first and second rollers 19*d*, 19*e* that travel in the fitting groove 18*b* of the auxiliary guide rail are supported in the vicinity of the coupled portion with the above-described first and second plates 19*a*, 19*b* so as to roll in a state where the first and second rollers 19*d*, 19*e* protrude outward in the left and right directions. Here, the travelling unit 19 is structured to be long in the lengthwise direction of the rails. However, by rockably coupling the coupled portions of the respective plates 19*a*, 19*b*, 19*c* and coupled portions of the first and second plates 19*a*, 19*c* and the first and second cables 17, 20, the travelling unit 19 is set so as to be capable of smoothly travelling along the curved portion 18*a* of the auxiliary guide rail 18.

Further, the travelling unit 19 is structured that an attaching support axis 19*f* is located between the axial supporting portions of the first and second rollers 19*d*, 19*e*, which are the intermediate portions in the lengthwise direction of the rail of the main plate 19*b* and that the base end portion of the attaching supporting axis 19*f* is fixed to the main plate 19*b* and the tip end portion thereof protrudes inwardly in the left and right directions. On the other hand, reference number 21 denotes an engagement body attached to the protrusion end portion of the attaching supporting axis 19*f*, and the engagement body 21 is composed of an engagement supporting portion 21*a* whose base end portion is fitted to the attaching supporting axis 19*f*, and an engagement body portion 21*c* fitted to the tip end portion protruding inwardly in the left and right directions of the engagement supporting portion 21*a* using a screw 21*b*. The engagement body portion 21*c* is set so that it is fitted to the engagement receiving member 15 secured at the lower end of the above-described guard member 10 so as to be freely engaged with or disengaged from the engagement receiving member 15. Herein, the engagement body portion 21*c* is made of a material having resiliency such as resin, etc., and is formed to be cylindrical, and the outer shape of the engagement body portion 21*c* is determined so that the engagement body portion can be idly fitted in a gap portion between the folding piece 15*b* of the engagement receiving member and the front face of the seat plate 10*b* thereof, and further is disposed in a position that does not interfere with the outside face of the guard member 10.

Figure 4:
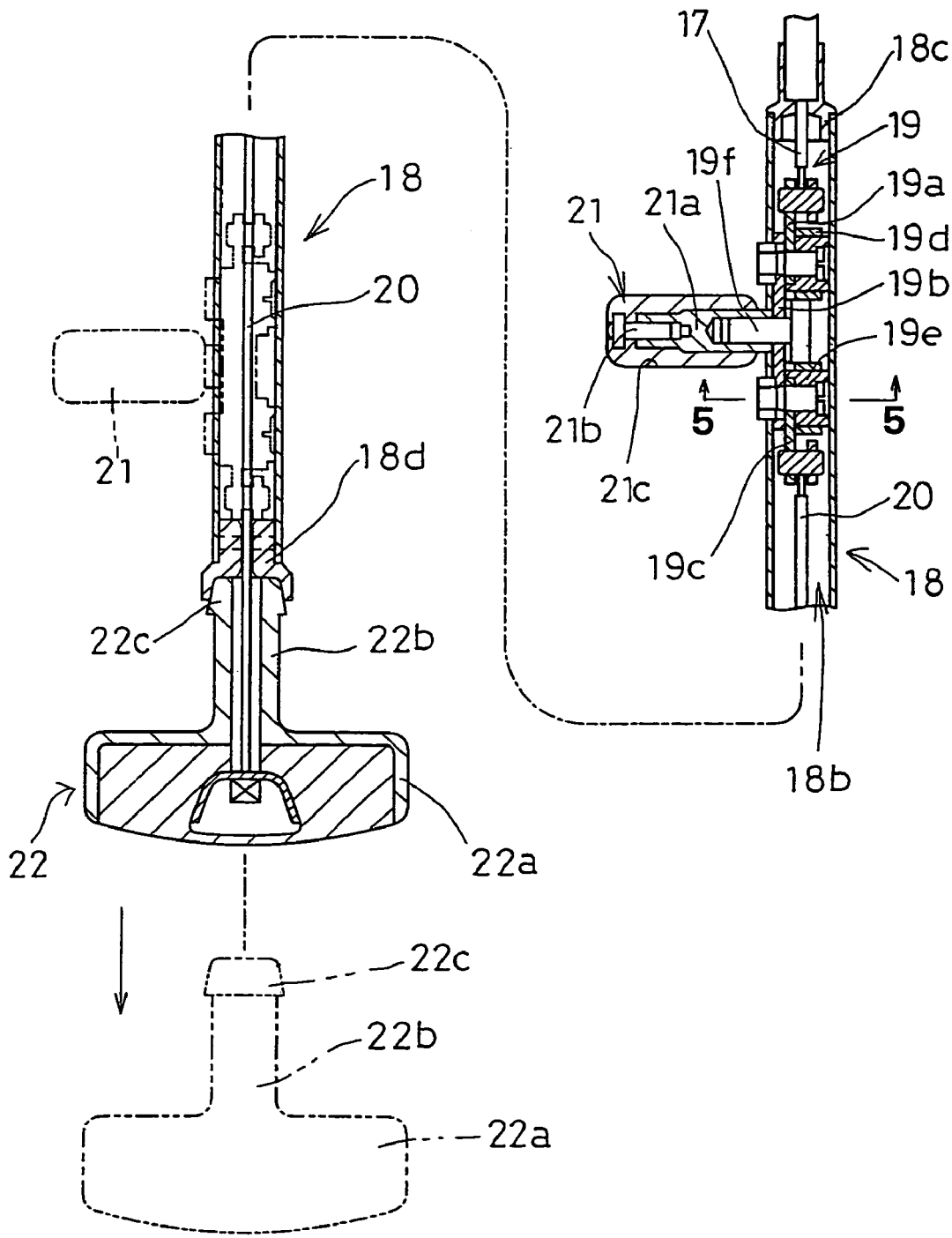
FIG. 4 is a partial front side sectional view showing the auxiliary closing device.
Figure 6A:
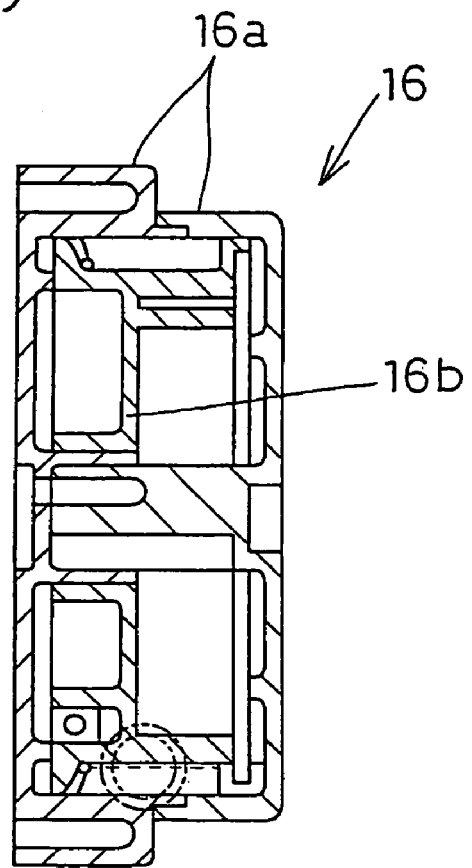
FIGS. 6(A) and (B) are, respectively, a front sectional view and a side elevational view showing the cable winding device.
Figure 6B:
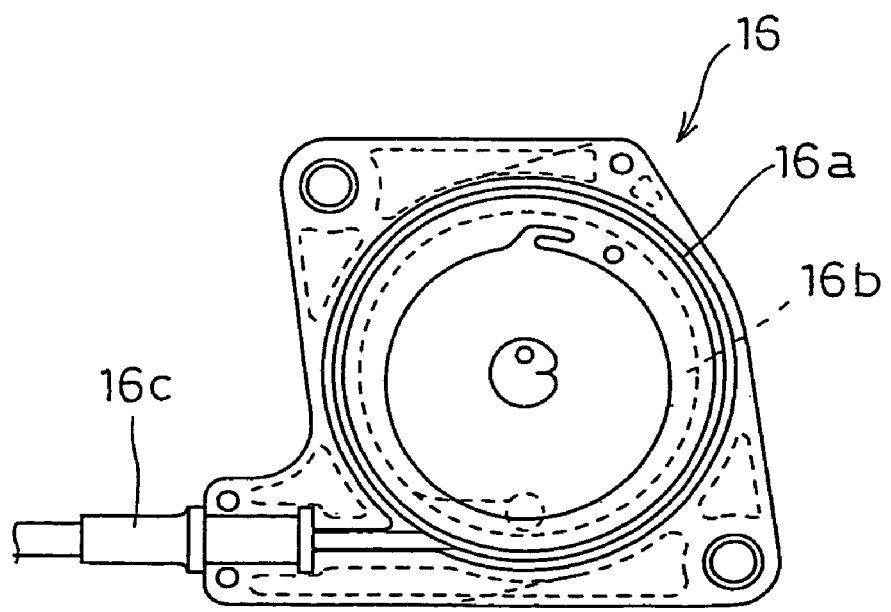
Figure 7:
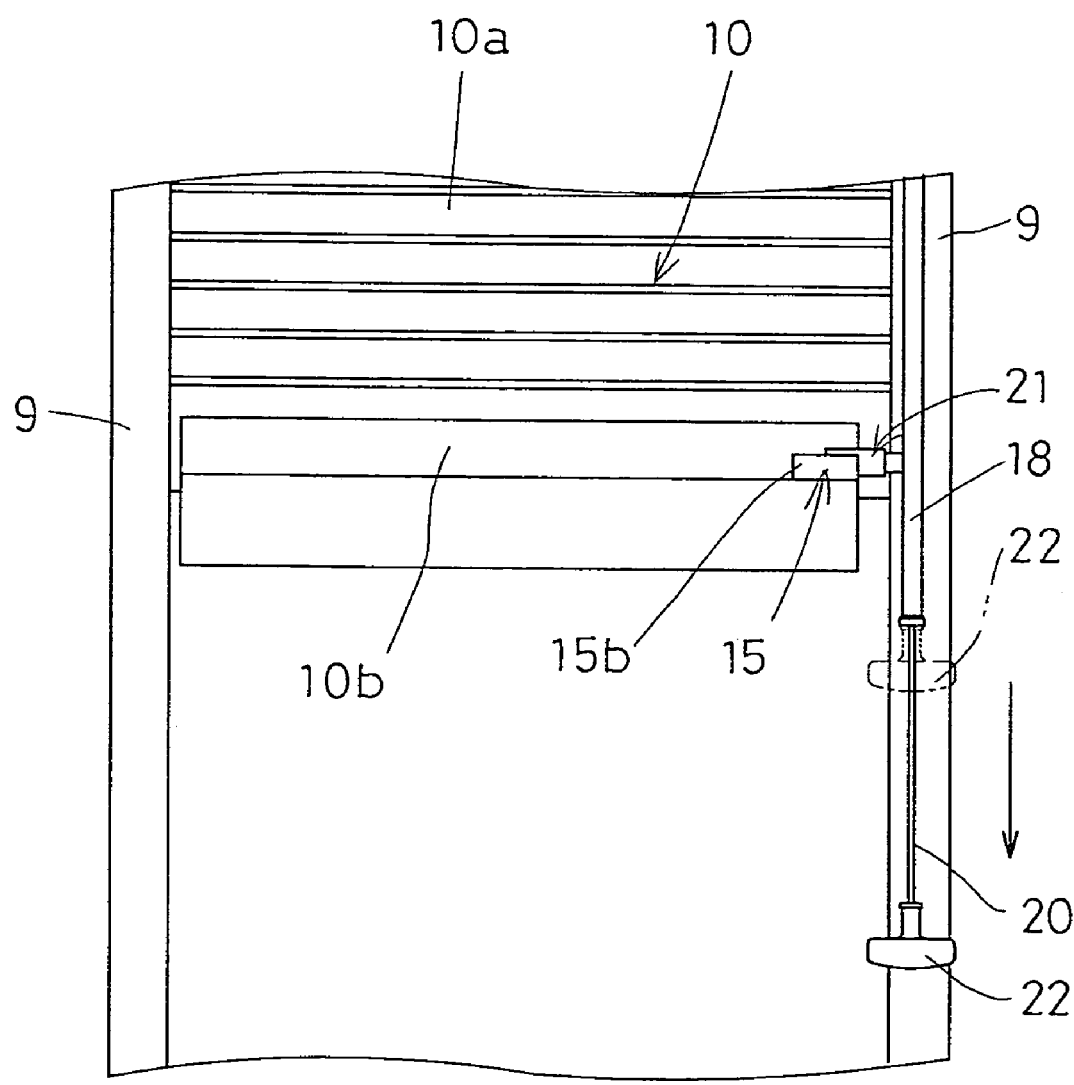
FIG. 7 is a front elevational view showing the major portions of the shutter type guard apparatus.
Figure 8:
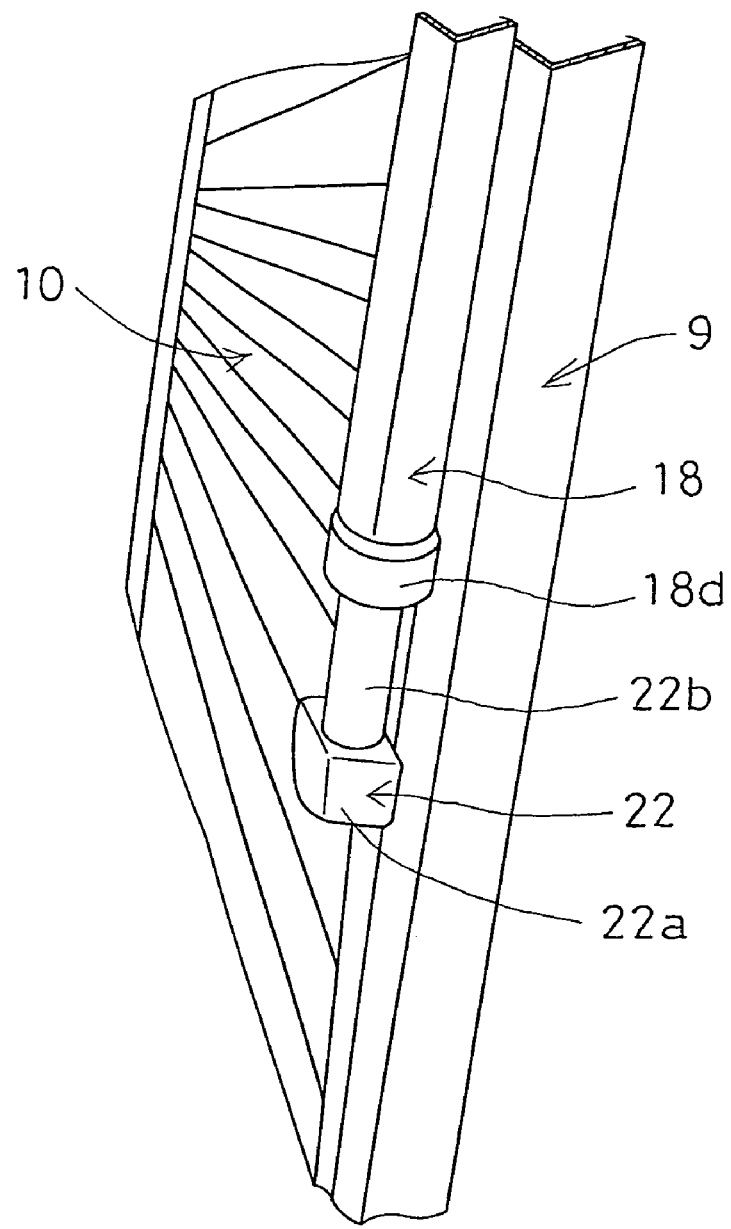
FIG. 8 is a perspective view showing the major portions of the shutter type guard apparatus.
Figure 9:
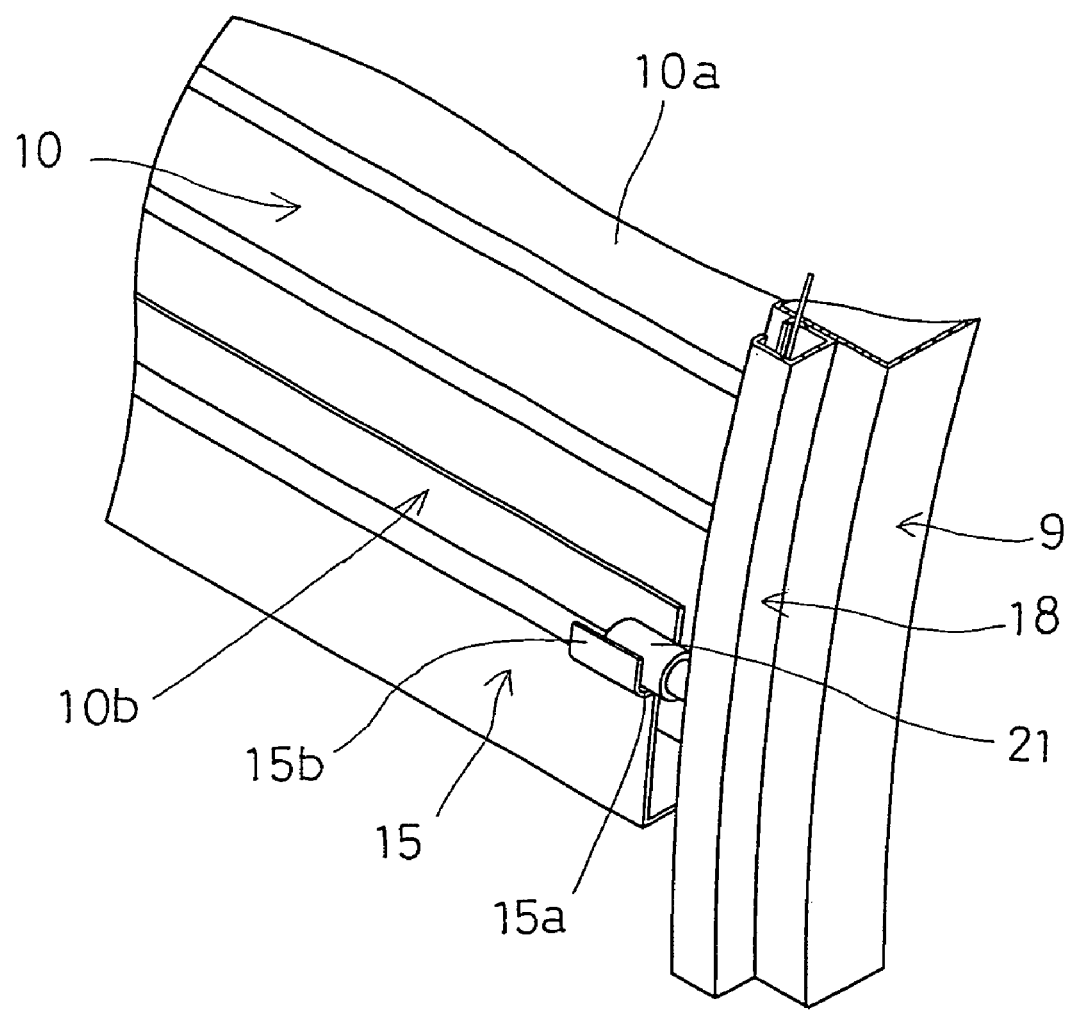
FIG. 9 is a perspective view showing the major portions of the shutter type guard apparatus.
Figure 10:
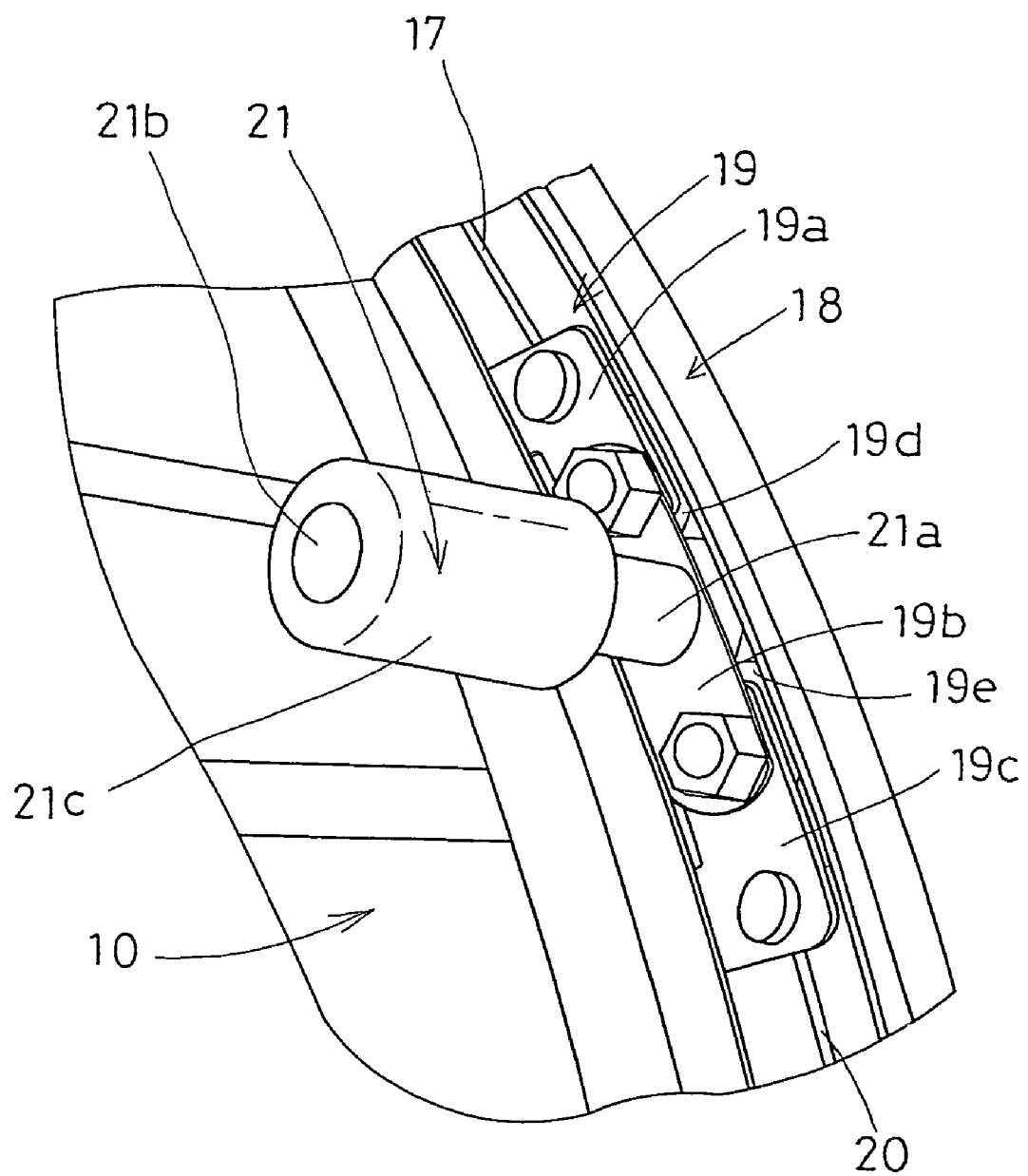
FIG. 10 is an enlarged perspective view showing the major portions of the shutter-type guard apparatus.

On the other hand, the tip end portion (extension end portion) of the second cable 20, the base end portion of which is coupled to the second plate 19*c* of the travelling unit 19, is drawn out from the lower side end of the auxiliary guide rail 18 to the outside, and a pull handle 22 which becomes an operating tool for an operator is integrally coupled to the drawn-out tip end portion. The above-described pull handle 22 has a gripping portion 22a formed at its tip end and a cylindrically thinned portion 22b formed at its base end. The second cable 20 is inserted from the cylindrically thinned portion 22b side and is supported and fixed at the gripping portion 22a at the tip end thereof. Also, the pull handle 22 is set so that, in a natural state where the first cable 17 receives a pressing force of a winding spring of the cable winding device 16 and is wound around the rotating body 16b, it is in a non-operating state in which the base end side edge 22c of the cylindrically thinned portion 22b is engaged with and fixed at the stopper member 18d at the lower end portion of the auxiliary guide rail 18. And, the pull handle 22 is located at the lower end portion of the auxiliary guide rail 18 in the above-described non-operating state, and as described above, is located in a position at which an operator riding on the lower travelling body 2 can easily reach. In this state, the travelling unit 19 is located at the stopper piece 18c side of the side end portion of the shutter casing 12 of the auxiliary guide rail 18 as shown in FIG. 4. In this state, the positional relationship is such that the engagement body 21 secured at the travelling unit 19 is engaged with the engagement receiving member 15 of the guard member 10 located at its open position. The position is equivalent to a non-operating state of the engagement body 21.

Thus, setting is established such that, where the pull handle 22 is operated and pulled downward from the above-described non-operating state, the first cable 17 is drawn out. In line therewith, the travelling unit 19 causes the auxiliary guide rail 18 to move and travel toward the stopper member 18d at the lower end portion. And, setting is established such that, when the travelling unit 19 is engaged with and fixed at the stopper member 18d, it is subjected to restriction of movement, wherein the pulling operation of the pull handle 22 is stopped. In a movement-restricted state of the travelling unit 19, setting is established such that, the pull handle 22 is made into an operating state located downward of the auxiliary guide rail 18, and the engagement body 21 is made into its operating state located at the lower end portion of the auxiliary guide rail 18 to which the operator can reach by hand. The auxiliary closing device CS is thus structured.

In addition, where a pulling operation of the pull handle 22 is stopped, the cable winding device 16 winds up the first cable 17, wherein the pull handle 22 and the travelling unit 19 are set to be automatically returned. And, the pull handle 22 is set so that winding of the first cable 17 is stopped by the upper end portion 22c of the cylindrically thinner portion 22b being engaged with the stopper member 18d at the lower end portion of the auxiliary guide rail 18. At this time, without interfering with the outside face of the guard member 10, the engagement body 21 of the travelling unit 19 moves to the open position side of the guard member 10 in a state where it moves in the vicinity of the outside face of the guard member 10 which is half opened, and is returned to its non-operating state.

And, in the auxiliary closing device CS, by operating and pulling the pull handle 22 downward against the pressing force of the winding spring of the cable winding device 16, the first cable 17 is unwound from the cable winding device 16. In line therewith, the travelling unit 19 moves to the stopper member 18d of the auxiliary guide rail 18 in the auxiliary guide rail, wherein the engagement body 21 is shifted from its non-operating state to its operating state. At this time, with the engagement body 21 being engaged with the engagement receiving member 15 of the guard member 10, the guard member 10 is integrally operated for closing, whereby the guard member 10 can be forcibly closed to an intermediately opened position where an operator can reach by hand. Thereafter, by the operator releasing his/her hand from the pull handle 22 and holding and pulling down the seat plate 10b portion of the guard member 10, the guard member 10 can be fully closed at the closed position.

Figure 2:
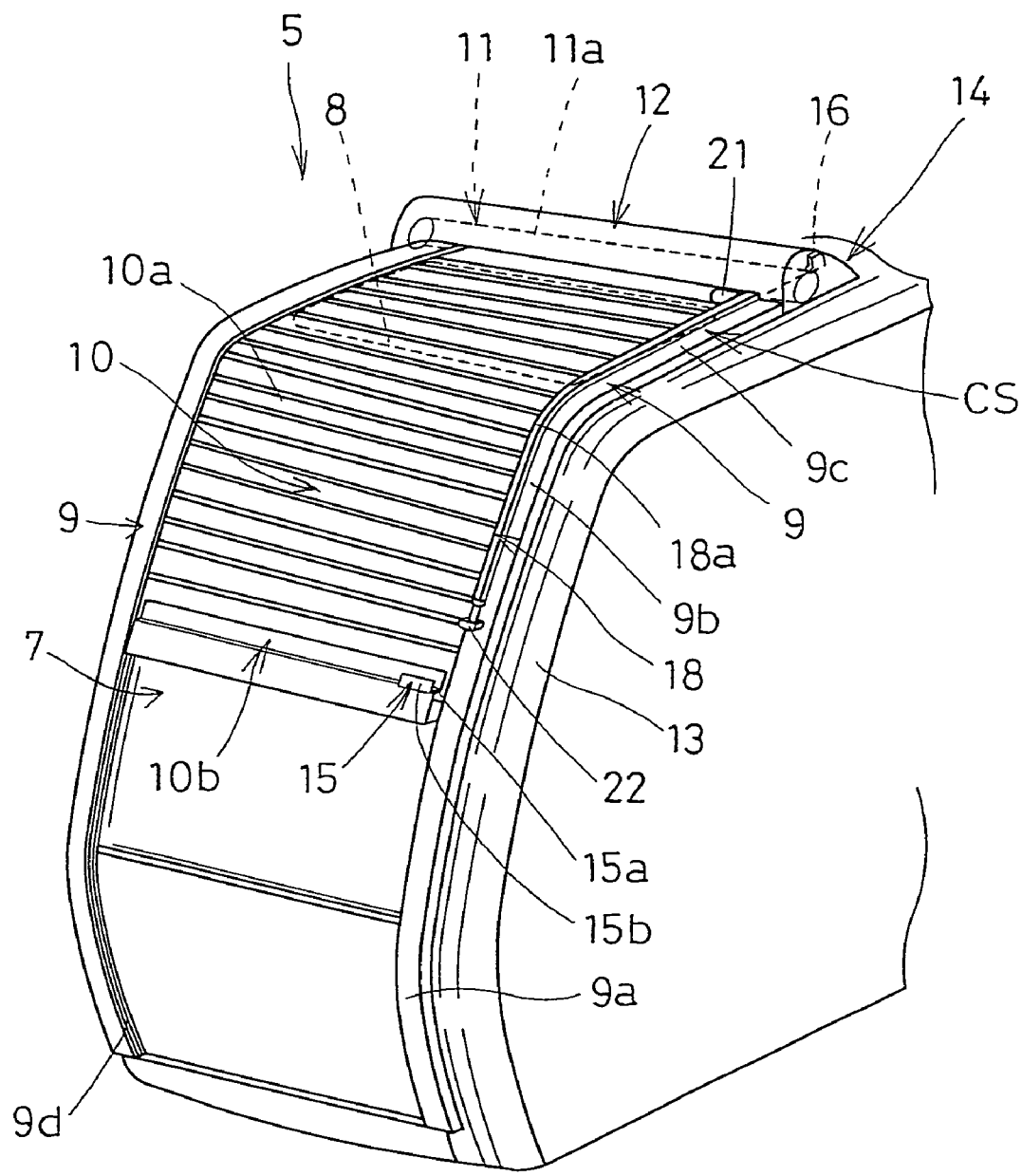
FIG. 2 is a perspective view of a shutter type guard apparatus.
Figure 3:
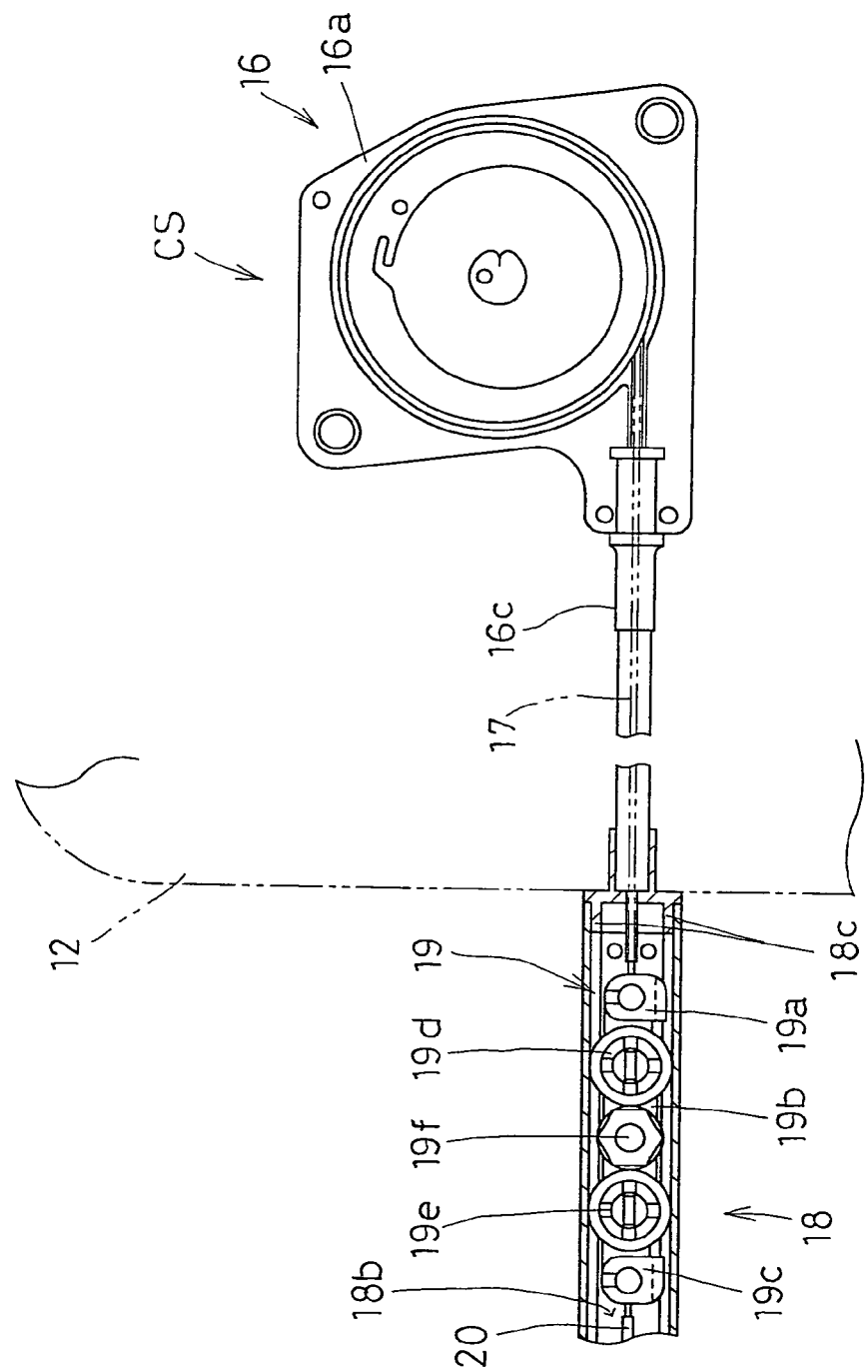
FIG. 3 is a partial sectional side elevational view showing the upper portion of the auxiliary closing device.

In this connection, FIG. 2 shows a state where, after the guard member 10 is closed to an intermediately opened position by operating and pulling the pull handle 22, the engagement body is made into a non-operating state by releasing a hand from the pull handle 22, and the guard member 10 is further slightly closed by holding the seat plate 10b of the guard member 10.

In such a structure as described above, when the hydraulic shovel 1 is left outdoors at night, the guard member 10 of the shutter type guard apparatus 6 is closed to cover the front window portion 7, whereby it is possible to protect the cab from vandalism and/or theft, etc. The guard member 10 is structure so as to integrally cover the entirety from the front window portion 7 to the ceiling skylight window 8 installed on the ceiling face 14. The guard member 10 in its open position is located at the ceiling face 14 side of the cab 5, wherein an operator cannot directly carry out a closing operation. In this case, an auxiliary closing device CS is provided at one of a pair of left and right guide rails 9 by which the guard body 10 is guided for movement, and the engagement body 21 moving while being guided by the auxiliary guide rail 18 is engaged with the engagement receiving member 15 provided at the guard member seat plate 10b, wherein the guard member seat plate 10b is forcibly shifted to a position to which an operator can reach by hand. As a result, where the guard member 10 is operated for closing, an operator operates the pull handle 22 in an easy operating state and closes the guard member 10 to an intermediately opened position where it is easy for the operator to operate. After that, the guard member 10 is pulled down for full closing, wherein it is possible to simply and easily close the guard member 10.

Further, since the pull handle 22 for moving the engagement body 21, which is engaged with the guard member 10, in the auxiliary guide rail 18 is disposed at an intermediate position in the vertical direction in the guide rail, to which an operator can reach by hand, such inconvenience does not arise, by which the operation for pulling the guard member becomes difficult as in such a type in which a conventional operation rod is used, and the window portions are damaged by an operation rod or cord for operating and closing the guard member to an intermediately opened position.

In addition, in a guard apparatus in which the present invention is embodied, since it is possible to forcibly close the guard member 10 to an intermediately opened position by a simple operation by which the pull handle 22 is pulled downward, the operation is simplified, and further can be carried out in a stabilized posture, wherein operationality thereof is excellent. Still further, in this type, by releasing a hand after the guard member 10 is operated for closing to an intermediately opened position by pulling the pull handle 22, the first cable 17 is caused to receive a pressing force of a winding spring, and is automatically wound around the cable winding device 16, wherein the pull handle 22 is automatically returned, and it can be made into its non-operating state. At this time, in line with shift of the pull handle 22 to its non-operating state, the engagement body 21 can also be made into its non-operating state. As a result, when the guard member 10 is opened to an intermediately opened position, no state occurs in which the pull handle 22 suspends via the second cable 20. In addition, the engagement body 21 is in its non-operating state where it is located at the shutter casing 12 side which is a portion corresponding to the open position of the guard member 10 and is further located outward of the guard member 10, wherein no case occurs in which the auxiliary closing device CS becomes an obstacle. Therefore, there is no need to prepare spacing in which an operation rod is accommodated as in a conventional type using the operation rod, and such inconvenience does not arise, by which an operating cord is suspended from the window portion when the guard member is opened as in a conventional type using the operating cord.

Still further, with this type, since the engagement body 21 on which the weight of the guard member 10 operates with a large load is set and fixed at the main plate 19b of the travelling unit 19, a scooping force operates on the main plate 19. In this case, a pair of first and second rollers 19d, 19e are positioned and provided at both end portions in the travelling direction of the attaching supporting axis 19f of the engagement body 21. As a result, the main plate 19b is corrected in terms of its posture by a pair of first and second rollers 19d, 19e, wherein scooping of the main plate 19b can be resolved, and the travelling unit 19 can cause the auxiliary guide rail 18 to smoothly travel. In particular, as in a case where the auxiliary closing device CS is provided only at one side of the guide rails 9, the scooping problem of the main plate 19b of the above-described travelling unit 19 becomes serious. However, in this case, as described above, smooth travelling can be brought about by provision of a pair of first and second rollers 19d, 19e.

In addition, in this type, since the guard member 10 is structured to close the entirety from the front portion of the cab 5 to the ceiling face 14 so that it can cover up both the front window portion 7 and the ceiling skylight portion 8, a curved portion 18a is formed on the auxiliary guide rail 18 and the travelling unit 19 travels in the curved portion 18a. Since in the travelling unit 19 the main plate 19b are rockably coupled to the first and second plates 19a, 19c and the first plate 19a is rockably coupled to the first cable 17 while the second plate 19c is rockably coupled to the second cable 20, the travelling unit 19 is capable of smoothly travelling by rocking these coupled portions along the curved state of the curved portion 18a.

Furthermore, with this type, by forcefully and quickly pulling the pull handle 22, it is possible to pull the guard member 10 with an intensive force. In this case, the guard member 10 can be closed to an intermediately opened state to which an operator reaches by hand, without pulling until the pull handle 22 is made into its operating state. Further, where the pull handle 22 is forcefully and quickly pulled until the pull handle is made into its operating state, the guard member 10 can be closed to a further lower position beyond the above-described intermediately opened position. In any case, operationality become excellent.

In addition, it is a matter of course that the present invention is not limited to the above-described embodiment. An auxiliary closing device may be applied to a guard apparatus which can enclose only the front window portion. Further, the auxiliary closing device may be provided at both a pair of left and right guide rails. In this case, it is possible to set the guard member at an intermediately opened position by any one of the operating tools.

In addition, a shutter type guard apparatus according to the present invention may be embodied not only for a hydraulic shovel but also various types of construction machines, which are provided with a cab having a window portion.

INDUSTRIAL APPLICABILITY

As described above, a guard apparatus according to the present invention is very effective and useful for preventing vandalism and/or theft while a construction machine is parked, and in particular is adequate to make it easy to operate and pull the guard member of the guard apparatus.

What is claimed is:

1. A shutter type guard apparatus for a cab of a machine, the guard apparatus protecting a window portion of the cab of the machine comprising a pair of left and right guide rails disposed at the left and right sides of the window portion and a movable guard member of which left and right edge portions are guided by the guide rails and which is moved to its open position to open the window portion and to its closed position to close the window portion, wherein an engagement receiving member is provided at the lower end portion of the guard member and an auxiliary closing device is provided at one of the guide rails, the auxiliary closing device comprising:
   an engagement body engaging with the engagement receiving member to forcibly close the guard member from its open position to a half-opened position where an operator is able to operate the guard member; and
   an operating tool for bringing the engagement body to a movement operation, the operating tool disposed at an intermediate portion in the vertical direction of the window portion where an operator is able to operate.

2. The shutter type guard apparatus as set forth in claim 1, the auxiliary closing device further comprising:
   a travelling unit secured at a base end portion of the engagement body;
   an auxiliary guide rail, integrally secured at an upper portion of the one of the guide rails, in which the travelling unit movably travels;
   a first cable at the open position side and a second cable at the closed position side of the travelling unit, both of which respectively extend from the travelling unit to a respective side in the travelling direction and move in the auxiliary guide rail;
   a winding device, installed at the open position side of the guard member, which winds up the first cable; and
   a resilient retracting device, provided at the winding device, which retracts the first cable in the winding direction, wherein the operating tool is coupled to the end portion of the second cable, and the engagement body is shifted between its non-actuated state located at the opened position of the guard member and its actuating state for closing the guard member from its opened position to a half-opened position in linkage with a pulling operation of the operating tool against a retracting force of the resilient retracting device, and is reset to the non-actuated state by stopping a pulling operation.

3. The shutter type guard apparatus as set forth in claim 2, wherein the travelling unit comprises:
   a main plate at which a base end portion of the engagement body is fixed;
   a first plate and a second plate coupled at respective ends, in the travelling direction, of the main plate and to which said first and second cables are connected, and a pair of travelling rollers axially supported at both ends, in the travelling direction, of the engagement body fixing portion of the main plate.

4. The shutter type guard apparatus as set forth in claim 1, wherein the guard apparatus is structured so that the guard member covers a front window portion and a ceiling skylight portion, and the guide rails and auxiliary guide rail are respectively provided with curved portions at the upper portions thereof.

5. The shutter type guard apparatus as set forth in claim 3, wherein the couplings between the main plate and the first and second plates and between the first and second plates and the first and second cables are rotatable, and because the respective coupled portions of the travelling unit are rotatable with respect to each other, the travelling unit is able to travel in the curved portion of the auxiliary guide rail formed along the guide rail.

6. The shutter type guard apparatus as set forth in claim 1, wherein the auxiliary closing device is provided at one side in the left and right directions of the guard member.

7. The shutter type guard apparatus as set forth in claim 2, wherein the guard apparatus is structured so that the guard member covers a front window portion and a ceiling skylight portion, and the guide rails and auxiliary guide rail are respectively provided with curved portions at the upper portions thereof.

8. The shutter type guard apparatus as set forth in claim 3, wherein the guard apparatus is structured so that the guard member covers a front window portion and a ceiling skylight portion, and the guide rails and auxiliary guide rail are respectively provided with curved portions at the upper portions thereof.

9. The shutter type guard apparatus as set forth in claim 4, wherein the couplings between the main plate and the first and second plates and between the first and second plates and the first and second cables are rotatable, and because the respective coupled portions of the travelling unit are rotatable with respect to each other, the travelling unit is able to travel in the curved portion of the auxiliary guide rail formed along the guide rail.

10. The shutter type guard apparatus as set forth in claim 2, wherein the auxiliary closing device is provided at one side in the left and right directions of the guard member.

11. The shutter type guard apparatus as set forth in claim 3, wherein the auxiliary closing device is provided at one side in the left and right directions of the guard member.

12. The shutter type guard apparatus as set forth in claim 4, wherein the auxiliary closing device is provided at one side in the left and right directions of the guard member.

13. The shutter type guard apparatus as set forth in claim 5, wherein the auxiliary closing device is provided at one side in the left and right directions of the guard member.

14. The shutter type guard apparatus as set forth in claim 7, wherein the auxiliary closing device is provided at one side in the left and right directions of the guard member.

15. A security member for covering an operational viewing area in a cab of an operational machine, comprising:
a pair of opposing guide rails, a guide rail on each side of the operational viewing area;
a cover member moving along the opposing guide rails to cover the operational viewing area and having an engagement member;
at least one auxiliary guide member mounted to a corresponding guide rail;
an operating member moving in the auxiliary guide member and having an engaging member engaging the engagement member of the cover member and further having an operating tool; and
a retraction device that retracts the operating member, wherein the at least one auxiliary guide member extends from an end of the corresponding guide rail at a top portion of the cab to substantially a mid-point of a portion of the corresponding guide rail extending along the operational viewing area.

16. The security member according to claim 15, further comprising a second retraction device that retracts the cover member, wherein the retracting device is at an end of the second retracting device.

17. The security member according to claim 15, wherein the operating member comprises:
a first cable attached at one end of the retracting device;
a main section having the engaging member mounted thereto and having a pair of rollers mounted to a side opposite to the engaging member and offset from one another with the engaging member therebetween;
a pair of side sections, a side section rotatably mounted adjacent each roller, the first cable attached at the other end to one side section; and
a second cable attached at one end to the other side section and having the operating tool at the other end, the operating tool being a pull handle.

18. The security member according to claim 15, wherein the operational viewing area includes a viewing area in a ceiling of the cab and a front viewing area, the second retracting device extending along a side of the ceiling viewing area away from the front viewing area.

19. The security member according to claim 17, wherein the engaging member comprises a post mounted at one end to the main section of the operating member and the engagement member comprises a U-shaped pocket at a lower end of the cover member, wherein the post is received in the U-shaped pocket when an operator pulls on the pull handle.

20. The security member according to claim 16, wherein the retraction device includes a spool for receiving the first cable and a retracting spring and the second retraction device includes a roller for receiving the cover member and a retracting spring.

* * * * *